United States Patent
Mejias

(10) Patent No.: US 8,229,596 B2
(45) Date of Patent: Jul. 24, 2012

(54) SYSTEMS AND METHODS TO INTERFACE DIVERSE CLIMATE CONTROLLERS AND COOLING DEVICES

(75) Inventor: Jose M Mejias, Isabela, PR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 802 days.

(21) Appl. No.: 12/238,281

(22) Filed: Sep. 25, 2008

(65) Prior Publication Data

US 2009/0287866 A1     Nov. 19, 2009

Related U.S. Application Data

(60) Provisional application No. 61/053,736, filed on May 16, 2008.

(51) Int. Cl.
*G01M 1/38* (2006.01)
(52) U.S. Cl. .............................. 700/276; 700/21; 700/79
(58) Field of Classification Search .................... 700/19, 700/20, 21, 276–278
See application file for complete search history.

(56) References Cited

U.S. PATENT DOCUMENTS

| | | | |
|---|---|---|---|
| 4,507,760 A * | 3/1985 | Fraser | 365/221 |
| 6,279,038 B1 * | 8/2001 | Hogan et al. | 709/224 |
| 2005/0229182 A1 * | 10/2005 | Grover et al. | 718/105 |
| 2005/0246408 A1 * | 11/2005 | Chung | 709/200 |
| 2006/0190138 A1 * | 8/2006 | Stone et al. | 700/276 |
| 2007/0021872 A1 * | 1/2007 | Fisher | 700/277 |
| 2007/0102149 A1 * | 5/2007 | Kates | 165/208 |
| 2007/0260417 A1 * | 11/2007 | Starmer et al. | 702/136 |
| 2008/0188989 A1 * | 8/2008 | Cha et al. | 700/277 |
| 2010/0217837 A1 * | 8/2010 | Ansari et al. | 709/218 |

* cited by examiner

*Primary Examiner* — Mohammad Ali
*Assistant Examiner* — Nathan Laughlin

(57) ABSTRACT

A method includes storing information regarding protocols required by a plurality of climate controllers and a plurality of cooling devices. A request message is received from a first of the climate controllers, the request message being addressed to a specific cooling device. A protocol required by the specific cooling device is determined using the stored information regarding protocols required by the cooling devices. The request message is converted to the protocol required by the specific cooling device. A response message is queued from the specific cooling device if the time period allowed for responding to the first climate controller has expired. The queued response message is sent to the first climate controller when a subsequent request message is received from the first climate controller.

19 Claims, 4 Drawing Sheets

DSC Modbus TCP to N2 Address Conversion

| Name | unit | scale | register | Data Type | Object ID | Scaled Data Type | Scaling Raw Low | Scaling Raw High | Scaling Low | Scaling High |
|---|---|---|---|---|---|---|---|---|---|---|
| | | | | | | N2 Register | | Scaling | | |
| Supply Temp | C° | 1 | 30025 | 16 Bit Register | AI13 | 16 Bit Register | 32 | 77 | 0 | 25 |
| Supply Temp Setpoint | C° | 1 | 30026 | 16 Bit Register | AI16 | 16 Bit Register | 32 | 77 | 0 | 25 |

FIG. 1B: DSC Modbus TCP to N2 Address Conversion

| | DSC | | | | N2 Register | Scaling | | | | |
|---|---|---|---|---|---|---|---|---|---|---|
| Name | unit | scale | register | Data Type | Object ID | Scaled Data Type | Scaling Raw Low | Scaling Raw High | Scaling Low | Scaling High |
| Supply Temp | C° | 1 | 30025 | 16 Bit Register | AI13 | 16 Bit Register | 32 | 77 | 0 | 25 |
| Supply Temp Setpoint | C° | 1 | 30026 | 16 Bit Register | AI16 | 16 Bit Register | 32 | 77 | 0 | 25 |

FIG. 1C: DSC Modbus TCP to N2 Function Conversion

| Modbus | | N2 Data | | | | | |
|---|---|---|---|---|---|---|---|
| Function | Description | Command | Sub Command | Region | Attribute | Description | Notes |
| 01 | Read Coil Status | 1 | NA | 4 | 2 | Read Binary Output | Bit 6 provides the current status. Modbus allows for multi point re°uest. However N2 does not. Modbus Multiple re°uest should be serialized. |
| 02 | Read Input Status | 1 | NA | 2 | 3 | Read Binary Input | Bit 6 provides the current status. Modbus allows for multi point re°uest. However N2 does not. Modbus Multiple re°uest should be serialized |
| 03 | Read Holding Registers | 1 | NA | 3 | 3 | Read Analog Output | Attribute 2 and 3 included in the response. Modbus allows for multi point re°uest. However N2 does not. Modbus Multiple re°uest should be serialized. |
| 04 | Read Input Registers | 1 | NA | 1 | 2 | Read Analog Input | Attribute 2 and 3 included in the response. Modbus allows for multi point re°uest. However N2 does not. Modbus Multiple re°uest should be serialized. |
| 05 | Force Single Coil | 7 | 2 | 4 | NA | Override Binary Output | Modbus allows for multi point re°uest. However N2 does not. Modbus Multiple re°uest should be serialized |
| 06 | Preset Single Register | 7 | 2 | 3 | NA | Override Analog Output | Modbus allows for multi point re°uest. However N2 does not. Modbus Multiple re°uest should be serialized |
| 15 | Force Multiple Coils | 7 | 2 | 4 | NA | Override Binary Output | Modbus allows for multi point re°uest. However N2 does not. Modbus Multiple re°uest should be serialized. |

SYSTEMS AND METHODS TO INTERFACE DIVERSE CLIMATE CONTROLLERS AND COOLING DEVICES

CROSS REFERENCE TO RELATED APPLICATIONS

This application claims the benefit of provisional patent application Ser. No. 61/053,736, filed May 16, 2008, titled "Systems And Methods To Interface Diverse Climate Controllers And Cooling Devices."

BACKGROUND

Computer system reliability depends on environmental stability. An information technology (IT) facility such as a data center typically includes an environmental control system intended to operate each system within a suitable range of conditions.

Data center managers and customers face a growing challenge managing the cooling and electrical specifications of diverse information technology (IT) equipment deployed in data centers. Some cooling systems provide an optimal data center temperature control by sending temperature and fan speed setpoints to the cooling devices within the data center. There is no industry standard in terms of physical layers and industrial communication protocols in the Heating, Ventilation and Air Conditioning Industry (HVAC).

SUMMARY

Systems and methods are disclosed that include storing information regarding protocols required by a plurality of climate controllers and a plurality of cooling devices. A request message is received from a first of the climate controllers, the request message being addressed to a specific cooling device. A protocol required by the specific cooling device is determined using the stored information regarding protocols required by the cooling devices. The request message is converted to the protocol required by the specific cooling device. A response message is queued from the specific cooling device if the time period allowed for responding to the first climate controller has expired. The queued response message is sent to the first climate controller when a subsequent request message is received from the first climate controller.

BRIEF DESCRIPTION OF THE DRAWINGS

Embodiments of the invention relating to both structure and method of operation may best be understood by referring to the following description and accompanying drawings.

FIGS. 1B and 1C show an example of address and functions conversion details between Modbus TCP and N2 protocols.

DETAILED DESCRIPTION

Figure 1A:
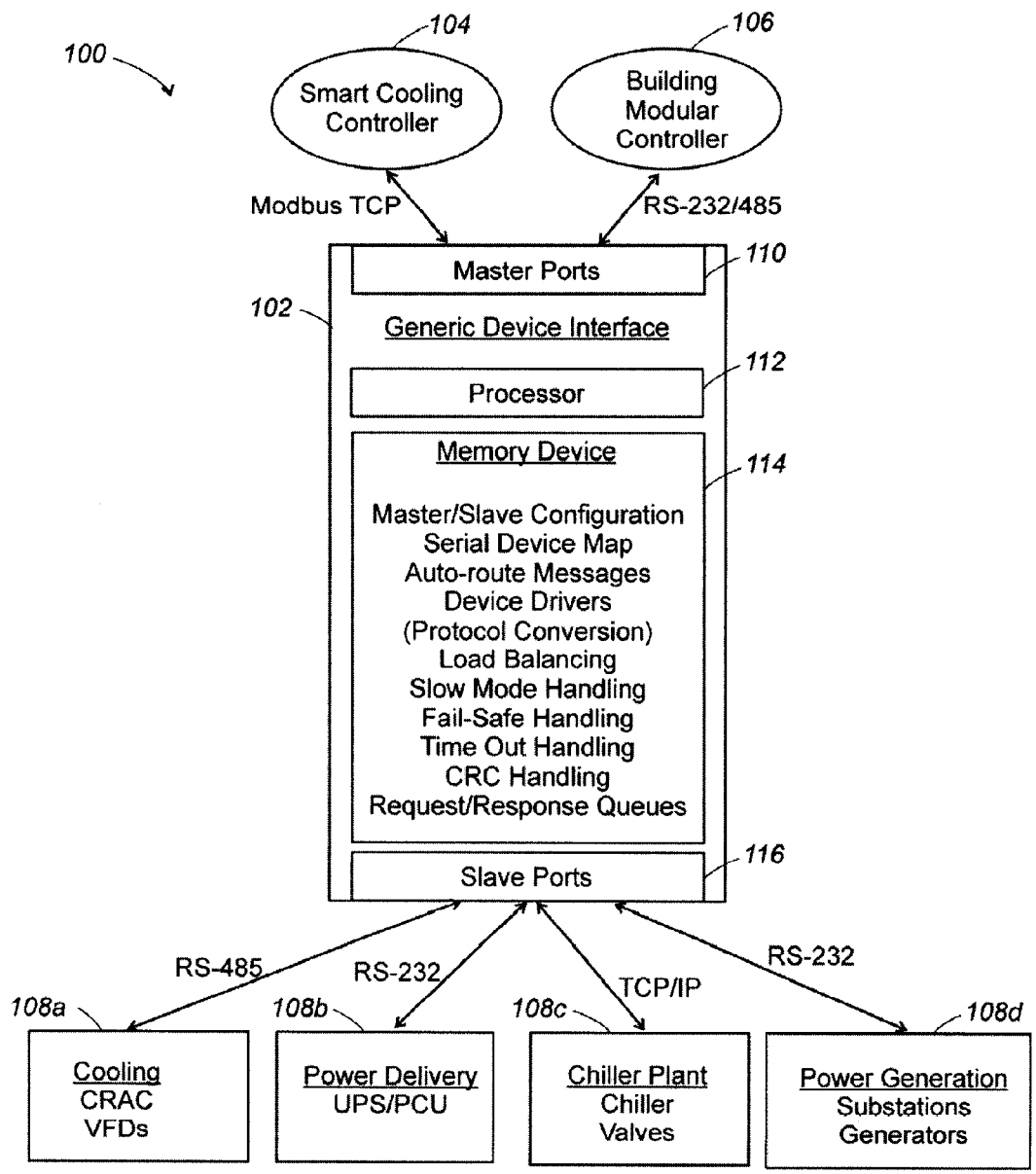
FIG. 1A is a schematic block diagram illustrating an embodiment of a system to interface diverse climate controllers and cooling devices.

Referring to FIG. 1A, a block diagram illustrating an embodiment of a system 100 is shown including generic device interface (GDI) 102 to translate messages in diverse communication protocols used by climate controllers 104, 106 to messages in communication protocols used by cooling devices 108a-108d (collectively "108"). The embodiment shown includes a smart cooling controller 104 and building modular controller 106. The cooling devices 108 include computer room air conditioning (CRAC) with variable frequency drive (VFD) 108a, uninterruptible power supply and power control unit 108b, chiller plant 108c, and power substations and generators 108d. Other controllers 104, 106, and cooling devices 108 can be used in addition to or instead of those shown. GDI 102 typically includes a computer processor 112, a memory device 114, and multiple master ports 110 and slave ports 116.

GDI 102 allows variables and registers to be defined per cooling device, therefore standardizing the mapping between controllers 104, 106 and cooling devices 108. A specific piece of information such as the Supply Air Temperature (SAT) can be accessed in GDI 102. GDI 102 provides mapping to request this information to a specified cooling device 108. The operational status of GDI 102 can be verified by smart cooling controller 104 and vice versa using a pre-agreed protocol.

GDI 102 sends temperature and fan speed set points from climate controllers 104, 106 to the cooling devices 108 within a data center. Smart cooling controller 104 provides automated thermal and power management techniques based on measurements of total airflow consumption including measurements of airflow derived from fan speed, pressure, and/or direct flow measurements from an anemometer and local ambient temperature information both at the front and rear of the computer server racks. The information can be used to control overall system volume flow produced by computer room air conditioning and to adjust the open area of perforated floor tiles at various suitable locations in the data center, thereby controlling local airflow. Dynamic sensing of airflow and load information in multiple individual locations and for multiple individual heat dissipating elements enables autonomous adjustment of cooling resources based on overall and local system conditions. Automated thermal and power management further can enable energy savings, allowing cooling reduction in low-load conditions while ensuring absolute maximum cooling for high-load operations under feedback control.

Dynamic sensing of airflow enables a data center manager or user to view the amount of air drawn by each individual server and accordingly can be used to facilitate arrangement and configuration of components, devices, and other structures in the data center. For example, airflow sensing may be used to detect overly-constrained signal cabling in a rack that impedes flow through the rack or locations in a room which are starved for air, resulting in a high ambient temperature.

Dynamic airflow sensing may also be used to make policy decisions. For example workload can be monitored for criticality of work that an individual server is performing. A server performing a higher criticality operation may be supplied with a higher airflow while another server performing a less important operation may be supplied with a lower airflow. An example of a smart cooling controller 104 is further described in Malone et al. U.S. patent application Ser. No. 11/046,476 entitled "Thermal And Power Management Apparatus", which is assigned to the same assignee as the present disclosure and is incorporated by reference herein.

Since there are no standard physical layers or communication protocols in the Heating, Ventilation and Air Conditioning Industry (HVAC), device interface 102 enables smart cooling controller 104 to interface with all the commonly used HVAC protocols and physical layers, and to include back-up fail-safe capability using building modular controller 106.

Processor 112 can be configured to execute logic instructions stored in one or more memory devices 114. Memory device 114 can store data and logic instructions for master/slave configurations, generating a serial device map, auto-routing messages, device drivers that typically implement protocol conversion, load balancing, slow-mode handling, fail-safe handling, time out handling, appending cyclic redundancy check (CRC) information to messages, and storage space for request and response message queues.

In some embodiments, control, status and alarm data is communicated between master ports 110 and controller 104 through an Ethernet TCP/IP interface by using Modbus TCP, while an RS-232 or 485 serial protocol is used to communicate data between controller 106 and master ports 110. GDI 102 can act as a slave device in a Modbus/TCP protocol communication by using the TCP/IP standard protocol. Modbus/TCP commands can be converted to the specified serial communication protocol and routed to the proper serial slave port 116. The protocol conversion can convert device ID, Message type, Message Address, register setting, and other relevant information to the proper protocol over the available physical layers such as RS-422, RS-485, RS-232 and TCP/IP while checking the integrity of the messages. Upon conversion, GDI 102 acts as a serial master sending converted request messages to the slave cooling devices 108.

Table 1 shows an embodiment of a list of parameters that can be used in GDI 102 to configure Modbus/TCP to serial protocol conversion with smart controller 104 or other master device using the Ethernet Modbus/TCP protocol. Table 1 further indicates the source of data for the parameters, such as smart controller 104, the network environment, and GDI 102. Note that similar tables for other serial devices can be included in memory device 114.

TABLE 1

Smart Controller Modbus/TCP to Serial Protocol Conversion Configuration

| Parameter | Smart Controller Application, Environment, Device Dependent | Description |
|---|---|---|
| Smart Controller Modbus/TCP Device Id | Smart Controller | Smart Controller Modbus device id. |
| Smart Controller Function Code | Smart Controller | Smart Controller Modbus function code for this message |
| Smart Controller Start Address | Smart Controller | Smart Controller Modbus start address of registers or coils |
| Smart Controller Length/Number Coils | Smart Controller | Smart Controller Modbus length in words or number of coils. Maximum of TBD words. |
| Serial Protocol | Environment | Serial protocol designator 00 = Modbus/RTU 01 = N2 02 = BACnet etc |
| Conversion Control | Device Dependent | Conversion Control Flags: bit 0 (01) = Register Bit Conversion Enable |
| Serial Device Id | Environment | Device Id of serial device on the RS-485 network. |
| Serial Function Code | Device Dependent | The serial function code for the specified serial protocol supported by the device |

TABLE 1-continued

Smart Controller Modbus/TCP to Serial Protocol Conversion Configuration

| Parameter | Smart Controller Application, Environment, Device Dependent | Description |
|---|---|---|
| Serial Start Address | Device Dependent | Start address of registers or coils |
| Register bit conversion table | Device Dependent | Register bit conversions. (This entry is valid if the Register Bit Conversion Enable Conversion control option is set.) |

GDI 102 can include an Ethernet interface to handle Ethernet access as defined by the TCP/IP standard. The protocol layer can be configured to handle various protocols such as Modbus TCP and SNMP, among others.

GDI 102 allows multiple serial and Modbus/TCP masters such as controllers 104, 106 to communicate with slave devices such as cooling devices 108 at the same time by routing request messages from controllers 104, 106 to the proper cooling devices 108 as the communication channel and response time permits. Accordingly, memory device 114 can include a map of the location and communication protocol of the serial devices per network to properly convert and route request and response messages. Details on protocol conversion can be handled by device drivers that include information on how to handle features such as framing, device identification, address conversion, function conversions, data scaling and error check conversion. For example, a smart cooling device (Modbus TCP) to N2 system protocol driver can execute the following process when addressing a particular Modbus TCP request. Note that FIGS. 1B and 1C show an example of address and functions conversion details between Modbus TCP and N2 protocols.

1. Receive Modbus TCP Frame
2. Decode Frame in Binary Mode and identify its contents
   a. Identify and Save Transaction Header (Byte 1 and 2)
   b. Identify and Save Product Identifier (Byte 3 and 4)
   c. Identify and Save Unit Identifier (Byte 7)
   d. Identify and Save Function Code (Byte 8)
   e. Identify and Save DSC Data Address of the first register by adding 30001 to the contents of Byte 9, and 10
   f. Identify and Save the Number of Registers to read (Byte 11 and 12)
3. Modbus TCP registers to read range goes from the first register to read up to (first register to read+number of registers −1).
4. Correlate Modbus TCP register to read with N2 object by using Table 2
5. For as many number of object ID to read, construct the N2 message as follows (using ASCII encoding)
   i. Frame Start (1 character)—Add N2 Frame start character ">" by using ASCII encoding
   ii. Unit Identifier (2 characters)—Retrieve Modbus Unit Identifier and decode it in ASCII mode.
   iii. N2 Data (2 characters)—Use Table 3 to identify the corresponding N2 data by using the requested Modbus Function code.
   iv. N2 Object ID (2 characters)—Append the first object ID
   v. N2 Attribute (2 characters)—Use Table 3 to identify the corresponding N2 attribute by using the requested Modbus Function code.

vi. Calculate Checksum (2 characters)—The checksum is computed by adding the values of all characters in the frame, excluding the frame start and frame end characters ">", <CR> respectively. The sum is then divided by 256 and the integer remainder in hex becomes the checksum.

vii. Frame End (1 Character)—Add N2 frame end character <CR> by using ASCII encoding.

6. Send the frame to the corresponding serial port by using the location map.
7. Wait for a response
8. Decode Response as follows:
   i. Frame response by identifying frame start and frame end characters.
   ii. Verify Response integrity by comparing the frame calculated CRC with frame CRC
   iii. Take bytes 4 to 11, decode them using ASCII and decode in BCD. Use IEEE 754-1985 floating point format to convert to a numerical value. Scale value as required by using Scaling parameters in Table 2. Save value.
9. Go to step 5 if there are more Object IDs to read. If not Go to step 10.
10. Build Modbus TCP Response as follows (Binary Encoding)
    i. Retrieve and Append Transaction Header (2 Bytes)
    ii. Retrieve and Append Protocol Identifier (2 Bytes)
    iii. Calculate Byte Length [3+2*(# of Objects)]
    iv. Retrieve and Append Unit Identifier (1 Byte)
    v. Retrieve and Append Function Code (1 Byte)
    vi. Calculate number of bytes to follow [2*(# of Objects)]
    vii. Append Objects Values (2 Bytes per Object)
11. Send to the TCP/IP Layer An example of conversions between DSC Modbus TCP to N2 is shown below:

| | | DSC Modbus TCP Request | | | | | |
|---|---|---|---|---|---|---|---|
| | | Hex | | | | | |
| Description | F5  8F<br>Transaction Header | 00  00<br>Protocol Identifier | 00  06<br>Length | 01<br>Unit Identifier | 04<br>Function Code | 00  24<br>Data Address of the<br>First Register | 00  02<br>Number of Register<br>To Read |
| Decimal | 62907 | 0 | 11 | 1 | 4 | 24 | 2 |

| | | | | N2 Requests | | | | | |
|---|---|---|---|---|---|---|---|---|---|
| | | | | Hex | | | | | |
| Description | 3E<br>Frame<br>Start | 30  31<br>Unit ID | 31<br>Command | 31<br>Region | 31  36<br>Object | 30  32<br>Atribute | 38  14<br>Checksum | 0D<br>Frame<br>End |
| ASCII | > | 0  1 | 1 | 1 | 1  6 | 0  2 | 8  C | <CR> |
| | | | | Hex | | | | | |
| Description | 3E<br>Frame<br>Start | 30  31<br>Unit ID | 31<br>Command | 31<br>Region | 31  33<br>Object | 30  32<br>Atribute | 38  39<br>Checksum | 0D<br>Frame<br>End |
| ASCII | > | 0  1 | 1 | 1 | 1  3 | 0  2 | 8  9 | <CR> |

| | | | | N2 Responses | | | | | | | |
|---|---|---|---|---|---|---|---|---|---|---|---|
| | | | | Hex | | | | | | | |
| Description | 41<br>Frame<br>Start | 30  30<br>Object Status | 34  32  38  43  30  30  30  30<br>Object Value | | | | | | | 45  37<br>Checksum | 0D<br>Frame<br>End |
| ASCII | A | 0  0 | 4  2  8  C  0  0  0  0 | | | | | | | E  7 | <CR> |
| | | | | Hex | | | | | | | |
| Description | 41<br>Frame<br>Start | 30  30<br>Object Status | 34  32  34  38  30  30  30  30<br>Object Value | | | | | | | 45  37<br>Checksum | 0D<br>Frame<br>End |
| ASCII | A | 0  0 | 4  2  4  8  0  0  0  0 | | | | | | | F  2 | <CR> |

| | | | | | | | | 04 Number of | | | | |
|---|---|---|---|---|---|---|---|---|---|---|---|---|
| | F5 | 8F | 00 | 00 | 00 | 06 | 01 | 04 | Data Bytes to | 00 | 24 | 00 | 02 |
| Description | Transaction Header | | Protocol Identifier | | Length | | Unit Identifier | Function Code | Follow | Data Register for 30025 | | Data Register for 30026 | |
| Decimal | 62907 | | 0 | | 11 | | 1 | 4 | 4 | 21 | | 10 | |

(Table header: DSC Modbus ICP Response — Hex)

GDI 102 can generate a devices location map by broadcasting requests to all available serial ports. It records the request responding serial port and unit identifier to construct a location map. The process is dynamic in nature, looking for lost devices whenever a response is not received in a given amount of time.

Additionally, memory device 114 can include information required to configure master ports 110 and slave ports 116, as required. Table 2 shows an example of parameters that can be used to configure serial master ports 110 and slave ports 116.

TABLE 2

Serial Port Configuration Parameters

| Parameter | Description |
|---|---|
| Baud Rate | Baud rate of serial port. |
| Interface Mode | Interface mode of serial port.<br>0 = RS-232 (Default)<br>1 = RS-422<br>2 = RS-485 |
| Parity | Serial port parity setting.<br>0 = None (Default)<br>1 = Even<br>2 = Odd |
| Data Bits | Number of serial port data bits. Valid Values: 5-8 (Default = 8) |
| Stop Bits | Number of serial port stop bits.<br>Valid Values: 1 or 2<br>(Default = 1) |
| Flow Control | Flow control setting.<br>0 = None (Default)<br>1 = RTS/CTS<br>2 = XON/XOFF<br>3 = Half Duplex |
| DTR Control | DTR settings.<br>0 = Off (Default)<br>1 = On |
| Receive Time Between Packets | Receive time between packets. Timeout if incomplete message is received. 0 to 65535 msec (Default = 100) |
| Serial Port Protocol | Serial Port Protocol Mode<br>0 = None<br>1 = Serial Port Master-<br>2 = Serial Port Slave |
| Serial Port Control Flags | Serial Port Control Flags<br>Bit 0 (0001 Hex) = Reserved<br>Bit 1 (0002 Hex) = Enable Discard Rx Packets With Errors<br>Bit 2 (0004 Hex) = Reserved<br>Bit 3 (0008 Hex) = Reserved<br>Bit 4 (0010 Hex) = Enable Lost Search Device Enable<br>Bit 5 (0020 Hex) = Reserved<br>Bit 6 (0040 Hex) = Reserved<br>Bit 7 (0080 Hex) = Reserved<br>Bit 8 (0100 Hex) = Reserved<br>Bit 9 (0200 Hex) = Enable Multi-Master Load Balancing<br>Bit 10 (0400 Hex) = Enable Slow Device Mode<br>Bit 11 (0800 Hex) = Perform Multi-Master Load Balancing based on Modbus/TCP connection. |
| Slave Device Response Timeout | The timeout period in which a slave device must respond before it is considered timed out. |
| Slow Device Mode Rx Message Age Time | Specifies how old a previously received response can be used as a valid response message. |
| Slow Device Mode TX Retries | Specifies how many retries are allowed before a write or Fail-Safe message is considered timed out. |

Figure 2:
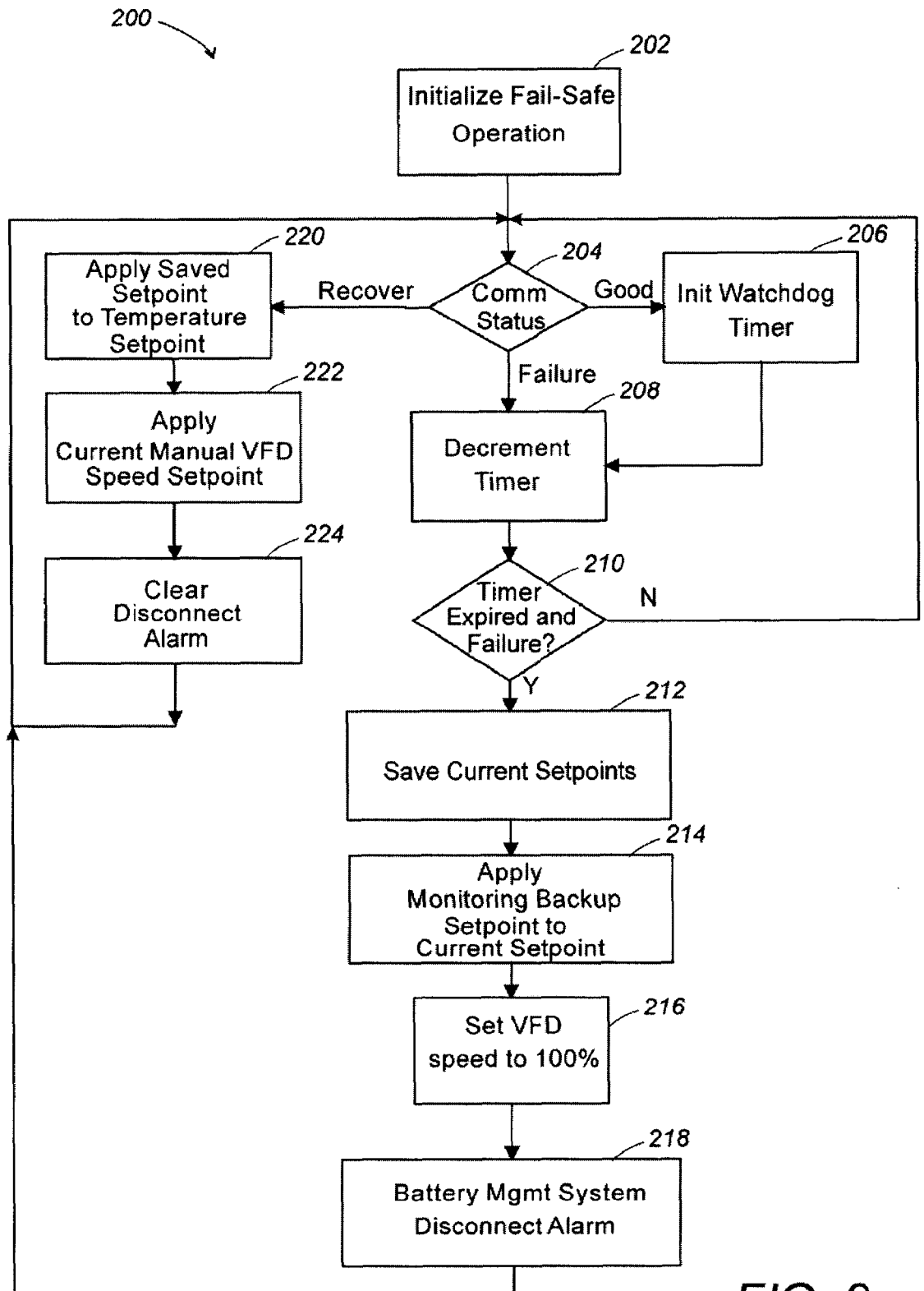
FIG. 2 is a flow diagram of an embodiment of a method for fail-safe cooling of a data center.

Referring to FIGS. 1 and 2, FIG. 2 shows a flow diagram of an embodiment of a fail-safe process 200. GDI 102 can detect the absence of smart cooling controller 104 by either counting the time between any request directed to the cooling devices or a particular register write request configured within GDI 102. For either case, a threshold time is configured, that if exceeded, triggers the mitigation actions. The mitigation actions can include saving the cooling device's current operation setpoints and writing safe operation setpoints to preconfigured registers that are read and used by a fail-safe controller, such as controller 106.

Process 202 can include initializing parameters for fail-safe operation. For example, GDI 102 can provide configuration interfaces for the user to select registers that contain current set point parameters for each cooling device 108. The interface may also allow the user to select the functions to properly read and write the set points. GDI 102 can include determining whether the specified functions successfully read/write the registers to help insure that fail-safe mode operates correctly. GDI 102 can also retry reading/writing the fail-safe registers in the event of read errors. A number of allowable retries can be specified before an alert is issued to the user.

Process 204 can include determining the communication status with smart controller 104. For example, whenever a preferred or primary controller, such as smart controller 104 stops sending data to GDI 102 for a preconfigured period of time, the fail-safe mode can be triggered to allow controller 106 to take over cooling control. This functionality can be configured for one, many, or all the controllers 104, 106.

If the communication status is good, process 206 initializes the watchdog timer to a predetermined value, for example 5 minutes. Process 208 can be performed on transition from process 206 or if process 204 determines there is a communication failure between GDI 102 and smart controller 104. Process 208 can include decrementing the timer, and transitioning to process 210 to determine whether the timer has expired and there is a communication failure. GDI 102 can expose a set of configurable registers set for watchdog timer register where the controllers 104, 106 can write periodically to indicate the operational status of the controllers 104, 106.

GDI 102 can also use an assigned register to which controllers 104, 106 can refer to determine the operational status of GDI 102.

If the timer has expired and a communication failure has been detected, processes 212-218 can be performed. Process 212 can include saving the current temperature setpoints being used by smart controller 104. Process 214 can include setting backup temperature setpoints to be used by controller 106 to the current temperature setpoints being used by smart controller 104. Process 216 can include setting the variable frequency drive (VFD) fan speeds to regulate the cooling devices 108. In some implementations, the fan speeds can be set to full (100%) for fail-safe mode. Other appropriate settings can be used, however. Process 218 can include raising a communication disconnect alarm in a battery management system so that backup power is available to system 100 and an operator is alerted that backup power has been activated. Process 218 can also indicate the number of devices 108 operating in fail-safe mode. Process 218 transitions to process 204 to once again determine communication status.

Referring again to process 204, process 204 can include determining whether GD1 102 is recovering from a communication failure with smart controller 104. If so, process 220 applies the setpoints saved in process 212 to the current setpoints. Process 222 can include applying the current VFD fan speeds, and process 224 can include clearing the disconnect alarm. GDI 102 can deactivate the alarm by clearing the number of devices 108 in fail-safe mode.

Table 3 shows an example of parameters that can be used to configure GDI 102 fail-safe functionality. Table 3 allows fail-safe mode to be configured for each device 108 as well as to provide the same configuration to many devices 108.

TABLE 3

Fail-Safe Configuration Parameters

| Parameter | Smart Controller Application, Environment, Device Dependent | Description |
|---|---|---|
| Fail-Safe Watchdog Enable Control | Smart Controller | Indicates the type of Fail-Safe timeout. 0 Disable - Fail-Safe disabled Bit 0 (01 Hex) On Modbus/TCP Master Timeout Bit 1 (02 Hex) On Serial Master Timeout Bit 2 (04 Hex) On Watchdog Register WriteTimeout Bits 3-7 = Reserved |
| Options | Device Dependent | Fail-Safe Options Bit 0 (01 Hex) = One register fail-safe Bit 1 (02 Hex) = Two registers fail-safe Bit 2 (04 Hex) = Three registers fail-safe |
| Master Designator | Smart Controller | Dependent on Enable Control Setting For Modbus/TCP Master mode: 0 = Any Modbus/TCP master IP Address of Modbus/TCP Master For Serial Master mode: 0 = Any serial master Port number of Serial Master (1-4) For Watchdog Register Write mode: 0 = Any Watchdog register $$ 100 to 300 |
| Read Register 1 Message Type | Environment | The Read Message Type for fail-safe register 1. For Modbus/RTU: 0 = Read Coils (Function Code = 1) 1 = Read Discrete Inputs (Function Code = 2) 2 = Read Holding Registers (Function Code = 3) 3 = Read Input Register (Function Code = 4) |
| Write Register 1 Message Type | Device Dependent | The Write Message Type for fail-safe register 1. For Modbus/RTU: 0 = Write Single Coil (Function Code = 5) 1 = Write Single Register (Function Code = 6) 2 = Write Multiple Coils (Function Code = 15) 3 = Write Multiple Registers (Function Code = 16) |
| Read Register 1 Address | Device Dependent | Read address for Fail-Safe register 1. |
| Write Register 1 Address | Device Dependent | Write address for Fail-Safe register 1. |
| Write Register 1 Value | Device Dependent | Write value for Fail-Safe register 1. This value will put the device into a Fail-Safe mode. |

TABLE 3-continued

Fail-Safe Configuration Parameters

| Parameter | Smart Controller Application, Environment, Device Dependent | Description |
| --- | --- | --- |
| Read Register 2 Message Type | Environment | The Read Message Type for fail-safe register 2. For Modbus/RTU: 0 = Read Coils (Function Code = 1) 1 = Read Discrete Inputs (Function Code = 2) 2 = Read Holding Registers (Function Code = 3) 3 = Read Input Register (Function Code = 4) |
| Write Register 2 Message Type | Device Dependent | The Write Message Type for fail-safe register 2. For Modbus/RTU: 0 = Write Single Coil (Function Code = 5) 1 = Write Single Register (Function Code = 6) 2 = Write Multiple Coils (Function Code = 15) 3 = Write Multiple Registers (Function Code = 16) |
| Read Register 2 Address | Device Dependent | Read address for Fail-Safe register 2. |
| Write Register 2 Address | Device Dependent | Write address for Fail-Safe register 2. |
| Write Register 2 Value | Device Dependent | Write value for Fail-Safe register 2. This value will put the device into a Fail-Safe mode. |
| Read Register 3 Message Type | Environment | The Read Message Type for fail-safe register 3. For Modbus/RTU: 0 = Read Coils (Function Code = 1) 1 = Read Discrete Inputs (Function Code = 2) 2 = Read Holding Registers (Function Code = 3) 3 = Read Input Register (Function Code = 4) |
| Write Register 3 Message Type | Device Dependent | The Write Message Type for fail-safe register 3. For Modbus/RTU: 0 = Write Single Coil (Function Code = 5) 1 = Write Single Register (Function Code = 6) 2 = Write Multiple Coils (Function Code = 15) 3 = Write Multiple Registers (Function Code = 16) |
| Read Register 3 Address | Device Dependent | Read address for Fail-Safe register 3. |
| Write Register 3 Address | Device Dependent | Write address for Fail-Safe register 3. |
| Write Register 3 Value | Device Dependent | Write value for Fail-Safe register 3. This value will put the device into a Fail-Safe mode. |

Figure 3:
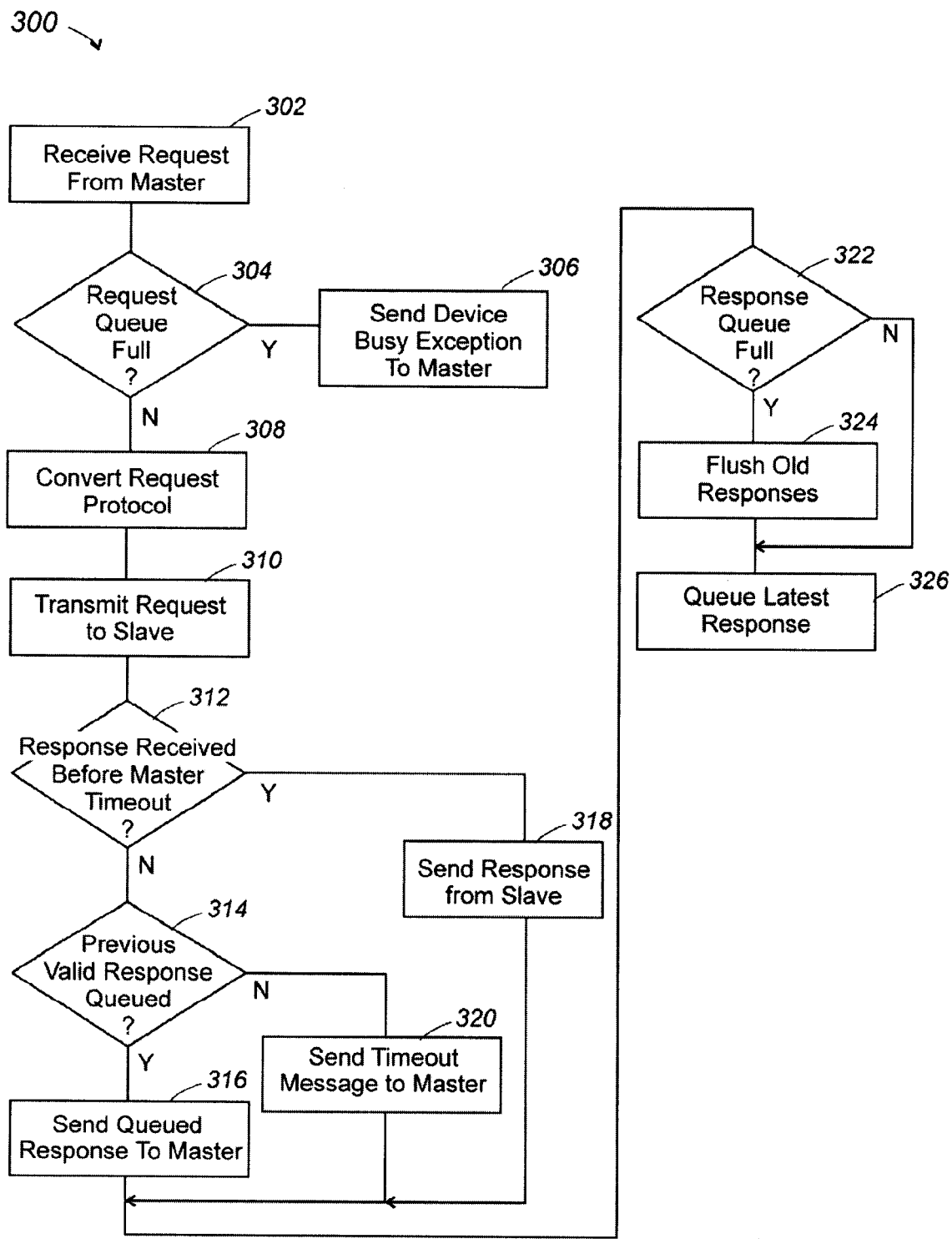
FIG. 3 is a flow diagram of an embodiment of a method for handling response and request messages in a system to interface diverse climate controllers and cooling devices.

Referring to FIGS. 1 and 3, FIG. 3 shows a flow diagram of an embodiment of a process 300 for queuing request and response messages in GDI 102. Multi-mastering in many cases is challenging since the network bandwidth is fully utilized either by devices 108 that take significant time to respond or by controllers 104, 106 that are configured for relatively high refresh rates. In some embodiments, request/response queues are allotted in memory device 114. For example, the request/response queues can accommodate the most recent 512 valid responses per serial port. The queued responses/requests can be time-stamped.

Process 302 can include receiving a request message from a master device, such as controllers 104, 106. Process 304 determines whether the request message queue is full. If so, process 306 can include sending an exception code indicating that GDI 102 is busy. The rejected requests can be removed to provide queue space for subsequent request messages.

If the request queue is not full, process 308 can include converting the protocol of the request message to the protocol required by the destination cooling device 108. Process 308 can use a map of the protocols required by each controller 104, 106 and each cooling device 108 stored in memory device 114. Process 310 can include transmitting the request message to the slave cooling device 108.

Process 312 can use a configurable timeout setting to determine the amount of time GDI 102 will wait for a valid response. If a response message is not received before the time expires, process 314 can include determining whether a valid response is available from the queue. If a valid response is available, process 316 sends the queued response to the master instead of a timeout condition. If a valid response is not found in the queue in process 314, process 320 can include sending a timeout message to the master.

Referring back to process 312, if a response is received before the time expires, process 318 sends the response message from the slave cooling device 108. GDI 102 can convert the message from the slave protocol to the protocol required by the requesting master.

After one of processes 316, 320, or 318 are complete, process 322 can include determining whether the response queue is full. If so process 324 can remove response messages that are older than a predetermined age from the queue. Once there is room in the queue, process 326 can include saving the most recent response in the queue so that it can be used if future requests timeout before a response is received. Process 326 is especially useful in situations where the request messages typically call for the same information on a periodic basis. By properly setting the timeout parameter for process 312 and the age time for process 324, GDI 102 can provide service to multiple master devices even in highly utilized networks.

Additionally, in some embodiments, write request messages can be given higher priority that read request messages. Further, a configurable write message retry count can be provided, where upon timeout, the message will be retried until either a valid response is received or the maximum number of retries has been achieved. If the latter occurs a timeout exception error can be sent. A load balancing technique can also be provided to assign the same level of attention to multiple master devices running at different network speeds and capabilities, such as Ethernet and RS-485 networks.

Note that parameters in GDI 102, such as the parameters shown in Tables 1-3 can be configured via SNMP, a Web browser interface, or one or more drivers installed and executing on GDI 102.

GDI 102 can also be configured to store statistics regarding the operation of GDI 102, controllers 104, 106, and cooling devices 108. For example, Table 4 shows an embodiment of TCP/IP Statistics that can be generated and stored by GDI 102.

TABLE 4

Serial Port Statistics

| Item | Description |
|---|---|
| Slave Mode Specific Statistics | |
| Messages Received From TCP/IP Masters | Displays the total number messages received from the TCP/IP Master |
| Responses Sent to TCP/IP Master | Displays the total number of messages responses sent to the TCP/IP Master. |
| Broadcasts Messages sent by TCP/IP Master | Displays the number of Modbus/RTU broadcast messages received. |
| RTU Messages Received From RTU Serial Master | Number of messages received from serial master. |
| RTU Broadcasts Received From RTU Serial Master | Displays the number of Modbus/RTU broadcast messages received. |
| Invalid Command Lengths | Displays the number of broadcast messages received with invalid command lengths. |
| Invalid Message Data Errors | Displays the number of messages received with invalid message data errors. These errors occur when GDI receives a message that cannot be processed due to improper message data. |
| Unknown Request Destination IDs | Displays the number of messages received with unknown request destination Ids. |

TABLE 4-continued

Serial Port Statistics

| Item | Description |
|---|---|
| Invalid request Protocol Types | Displays the number of messages received with invalid protocol errors. This occurs when a message is received with a protocol other than the Modbus protocol value of zero. |
| Unsupported Modbus Function Codes | Displays the number of messages received with unsupported function codes. |
| Oversized Received Data Packet Errors | Displays the number of received serial or Ethernet data packets that were larger than the configured maximum receive data packet. |
| Improper Configuration Errors | Number of errors that occurred due to an improper configuration. |
| System Resource Errors | Number of errors that occurred due to system resource problems. |
| Fail-Safe Timeout Processes Started | Number of Fail-Safe timeout processes that were started due to loss of communication with the specified Master(s). |
| Fail-Safe Timeout Process Errors | Number of errors that occurred during Fail-Safe timeout processes. |
| First Error Description | Description of first error that occurred. |
| Last Error Description | Description of last error that occurred. |

As another example, Table 5 shows an embodiment of Serial Port Statistics that can be generated and stored by GDI 102.

TABLE 5

Serial Port Statistics

| Parameter | Description |
|---|---|
| TX Byte Count | The number of bytes transmitted out this port. |
| TX Packet Count | The number of packets transmitted out this port. |
| RX Byte Count | The number of bytes received on this port. |
| RX Packet Count | The number of packets received on this port. |
| Parity Error Count | The number of parity errors that occurred on this port. |
| Framing Error Count | The number of framing errors that occurred on this port. |
| Overrun Error Count | The number of overrun errors that occurred on this port. |
| To PLC Dropped Packet Count | The number of responses received on this ports that were dropped and not returned to TCP/IP Master. |
| Invalid RTU Responses | The number of invalid serial responses returned on this port. |
| RTU Device Timeouts | The number of serial device timeouts that occurred on this port. |

Table 6 shows an embodiment of Serial Device Status and Statistics that can be generated and stored by GDI 102.

TABLE 6

Serial Device Specific Status and Statistics

| Parameter | Description |
|---|---|
| Device Id | Device Id of serial device. |
| Mode | Current operational mode of serial device:<br>0 = Normal Operating Mode<br>1 = To-Fail-Safe - Transitioning to Fail-Safe mode<br>2 = In-Fail-Safe - In Fail-Safe mode<br>3 = From-Fail-Safe - Transitioning from a Fail-Safe mode<br>4 = Multiple-States - Device Id has multiple Fail-Safe configurations assigned that are currently in different states. |

TABLE 6-continued

Serial Device Specific Status and Statistics

| Parameter | Description |
|---|---|
| TX Requests | The total number of requests transmitted to this device. |
| Rx Responses | The total number of responses received from this device. |
| Timeouts | The number of times messages transmitted to this device timed out. |
| Maximum Refresh Time | The maximum time it took to refresh a read request from this device. (Slow-mode specific.) |
| Average Refresh Time | The average time it took to refresh a read request from this device. (Slow-mode specific.) |
| Fail-Safes | The number of times a Fail-Safe configuration for this device was placed into Fail-Safe mode. |
| New Reads | The number of successful read responses received from this device. (Slow-mode specific.) |
| Previous Reads | The number of times a read response was received from this device and a previous response was returned. (Slow-mode specific.) |
| Write Retries | The number of times a write message had to be tried for this device. (Slow-mode specific.) |
| Write Fails | The number of times a write message failed after the configured number of retires had occurred. (Slow-mode specific.) |
| Fail-Safe Retries | The number of times a Fail-Safe process message had to be tried for this device. (Slow-mode specific.) |
| Fail-Safe Fails | The number of times a Fail-Safe process message failed after the configured number of retires had occurred. (Slow-mode specific.) |
| Invalid Responses | The number of invalid responses received from this device. |

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable medium for use by or in connection with any computer-related system or method. A computer-readable medium is an electronic, magnetic, optical, or other physical device or means that can contain or store a computer program for use by or in connection with a computer-related system, method, process, or procedure. Programs and logic instructions can be embodied in a computer-readable medium for use by or in connection with an instruction execution system, device, component, element, or apparatus, such as a system based on a computer or processor, or other system that can fetch instructions from an instruction memory or storage of any appropriate type.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. The illustrative techniques may be used with any suitable data center configuration and with any suitable servers, computers, and devices.

What is claimed is:

1. An airflow distribution system comprising:
a device interface module including a plurality of slave ports and a plurality of master ports, a processor, and logic instructions on computer readable media executable to cause the processor to:
receive a request message from one of a plurality of controller devices via one of the master ports;
decode the request message to determine one of a plurality of cooling devices to receive the request message;
determine a communication protocol required by the cooling device from among a plurality of cooling device communication protocols;
convert the request message to the determined communication protocol;
output the converted request message to the cooling device via one of the slave ports;
receive a response message from the cooling device via the one of the slave ports;
decode the response message to determine a receiving controller of said plurality of controller devices to receive the response message;
determine a controller communication protocol required by the receiving controller to receive the response message from among a plurality of controller communication protocols;
convert the response message to the determined controller communication protocol;
output the response message to the receiving controller via the one of the master ports;
determine whether communication with a first controller has failed by determining whether a threshold time between a request to the first controller and said processor has been exceeded;
save current operation setpoints of the cooling device; and
write safe operation setpoints to pre-configured registers that are read and used by a fail-safe controller.

2. The airflow distribution system of claim 1 further comprising:
the first controller configured to communicate with one of the master ports in the device interface module and to receive input from at least one temperature sensor, to monitor airflow for a plurality of cooling fans, and control cooling in a data center as a function of the airflow.

3. The airflow distribution system of claim 2 further comprising:
a second controller configured to communicate with another one of the master ports in the device interface module, to receive input from at least one sensor, and to issue request messages to control cooling equipment in the data center.

4. The airflow distribution system of claim 1, the logic instructions further comprising:
queue the response message if said receiving controller has timed out waiting for the response message; and
output the queued response message to said receiving controller when a subsequent request message is received from the first controller.

5. The airflow distribution system of claim 1 the logic instructions further comprising:
transmit default cooling parameters to a second controller when communication with the first controller has failed.

6. The airflow distribution system of claim 1 the logic instructions further comprising:
store fail-safe cooling parameters for at least some of the cooling devices;
determine whether communication with the first controller has failed via one of the master ports; and
transmit the fail-safe cooling parameters to a second controller via another one of the master ports when communication with the first controller has failed.

7. The airflow distribution system of claim 1 the logic instructions further comprising:
store operational statistics for messages received via the master ports and the slave ports.

8. The airflow distribution system of claim 1 the logic instructions further comprising:
receive and store configuration information for the interface device via at least one of the group consisting of: Simple Network Management Protocol messages, Hyper-text transfer protocol messages, and a driver program executing in the interface device.

9. A method comprising:
storing information regarding protocols required by a plurality of climate controllers and a plurality of cooling devices;
receiving a request message from a first climate controller, the request message being addressed to a specific cooling device;
determining a protocol required by the specific cooling device using the stored information regarding protocols required by the cooling devices;
converting the request message to the protocol required by the specific cooling device;
provided the time period allowed for responding to the first climate controller has expired:
sending the queued response message to the first climate controller when a subsequent request message is received from the first climate controller;
setting backup temperature setpoints to be used by the first climate controller to current temperature setpoints being used by a smart controller;
setting a variable frequency drive fan speeds to regulate the specific cooling device;
providing backup power to the plurality of climate controllers and the plurality of cooling devices; and
indicating a number of climate controllers and cooling devices operating in fail-safe mode.

10. The method according to claim 9 further comprising:
decoding the response message to determine the first climate controller to receive the response message;
determining a protocol required by the first climate controller using the information regarding protocols required by the plurality of climate controllers and the plurality of cooling devices;
converting the response message to the protocol required by the first climate controller; and
sending the response message to the first climate controller via one of a plurality of master ports.

11. The method of claim 9 further comprising:
determining whether the first climate controller has failed; and
transmitting default cooling parameters to a second of the climate controllers when communication with the first climate controller has failed.

12. The method of claim 9 further comprising:
storing fail-safe cooling parameters for at least some of the cooling devices;
determining whether communication with the first climate controller has failed via a first master port; and
transmitting the fail-safe cooling parameters to a second climate controller via a second master port when communication with the first climate controller has failed.

13. The method of claim 9 further comprising:
storing operational statistics for messages received via master ports and slave ports.

14. The method of claim 9 further comprising:
constructing a map of locations of the climate controllers and cooling devices to route the request and response messages.

15. The method of claim 9 further comprising:
placing the request messages in a queue while waiting for a current request to be processed.

16. The method of claim 9 further comprising:
load balancing the climate controllers and cooling devices running at different network speeds and capabilities.

17. The method of claim 9 further comprising:
notifying the climate controllers of an inability to accept more requests when a queue is determined to be full.

18. The method of claim 9 further comprising:
processing write request messages at higher priority than read request messages.

19. A computer usable storage medium having computer readable program code embedded therein that when executed by a processor performs a method for airflow distribution, the method comprising:
determining a plurality of communication protocols used by a plurality of climate controllers and a plurality of cooling devices;
converting a request message from a climate controller protocol of the plurality of communication protocols used by the plurality of climate controllers to a cooling device protocol of the plurality of communication protocols used by the plurality of cooling devices corresponding to the cooling device to which the request message will be sent;
provided the time periods allowed for responding to the climate controllers has expired:
queuing response messages from the cooling devices; and
raising a communication disconnect alarm in a battery management system wherein backup power is available to the plurality of climate controllers and cooling devices;
converting a response message from the cooling device protocols to the climate controller protocol corresponding to the climate controller to which the response message will be sent;
determining whether communication with a first climate controller has failed via a first master port; and
transmitting fail-safe cooling parameters to a second climate controller via a second master port when communication with the first controller has failed.

* * * * *